(12) United States Patent
Baek et al.

(10) Patent No.: US 12,066,703 B2
(45) Date of Patent: Aug. 20, 2024

(54) DISPLAY APPARATUS

(71) Applicant: LG ELECTRONICS INC., Seoul (KR)

(72) Inventors: Sangmin Baek, Seoul (KR); Keumdoo Choi, Seoul (KR); Junseok Tak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 17/762,949

(22) PCT Filed: Oct. 28, 2019

(86) PCT No.: PCT/KR2019/014238
§ 371 (c)(1),
(2) Date: Mar. 23, 2022

(87) PCT Pub. No.: WO2021/085656
PCT Pub. Date: May 6, 2021

(65) Prior Publication Data
US 2022/0365387 A1     Nov. 17, 2022

(51) Int. Cl.
*G02F 1/1333*     (2006.01)
(52) U.S. Cl.
CPC .. *G02F 1/133317* (2021.01); *G02F 1/133322* (2021.01)
(58) Field of Classification Search
CPC ................................................ G02F 1/133317
See application file for complete search history.

(56) References Cited

U.S. PATENT DOCUMENTS 3,659,719 A * 5/1972 Westlin ................ B01D 46/523
                                                         55/497
2007/0127271 A1    6/2007   Kim
(Continued)

FOREIGN PATENT DOCUMENTS

JP          2005196210        7/2005
KR    10-2000-0067743      11/2000
(Continued)

OTHER PUBLICATIONS

Korean Intellectual Property Office Application Serial No. 10-2022-7005593, Office Action dated Apr. 28, 2023, 4 pages.
(Continued)

*Primary Examiner* — Edmond C Lau
(74) *Attorney, Agent, or Firm* — LEE, HONG, DEGERMAN, KANG & WAIMEY

(57) ABSTRACT

A display apparatus according to an embodiment of the present invention comprises: a display panel; a case top-down assembly covering a lower area of the display panel; a middle cabinet in which the display panel is mounted, and a cover bottom coupled to the case top-down assembly and the middle cabinet. The middle cabinet comprises a first mounting unit overlapping a partial area at a first long side of the display panel; and a second mounting unit overlapping a partial area at a first short side of the display panel. Ends of the first mounting unit and the second mounting unit overlap each other in a first overlapping area.
The display apparatus of the present invention can be linked with an artificial intelligence module, a robot, an augmented reality (AR) device, a virtual reality (VR) device, a device related to a 5 G service, and the like.

9 Claims, 6 Drawing Sheets

(56) References Cited

U.S. PATENT DOCUMENTS

| | | | |
|---|---|---|---|
| 2007/0277419 A1* | 12/2007 | Tsai | G02F 1/133608 |
| | | | 40/785 |
| 2011/0292315 A1 | 12/2011 | Bae et al. | |
| 2018/0113352 A1* | 4/2018 | Arita | G02B 6/0055 |
| 2019/0129236 A1* | 5/2019 | Kim | H04M 1/0249 |
| 2019/0196251 A1 | 6/2019 | Woo et al. | |

FOREIGN PATENT DOCUMENTS

| | | |
|---|---|---|
| KR | 1020040006324 | 1/2004 |
| KR | 1020040105475 | 12/2004 |
| KR | 10-2005-0099692 | 10/2005 |
| KR | 10-2009-0110068 | 10/2009 |
| KR | 1020130030363 | 3/2013 |
| KR | 1020130099582 | 9/2013 |
| KR | 1020150025028 | 3/2015 |
| KR | 1020150135944 | 12/2015 |
| KR | 10-2016-0068030 | 6/2016 |
| KR | 10-2019-0056519 | 5/2019 |
| KR | 1020190049987 | 5/2019 |

OTHER PUBLICATIONS

European Patent Office Application Serial No. 19951218.7, Search Report dated Feb. 22, 2023, 10 pages.
PCT International Application No. PCT/KR2019/014238, International Search Report dated Jul. 17, 2020, 4 pages.
Korean Intellectual Property Office Application No. 10-2022-7005593, Notice of Allowance dated Oct. 10, 2023, 2 pages.

* cited by examiner

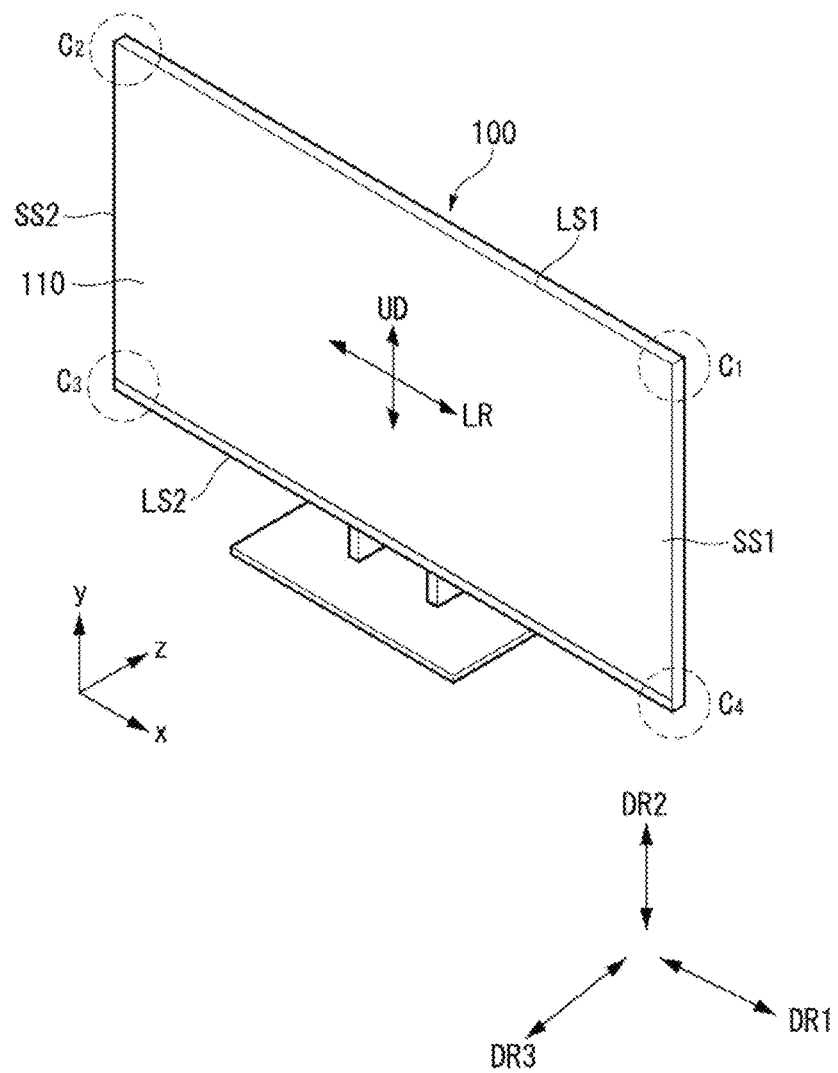

[FIG. 2]
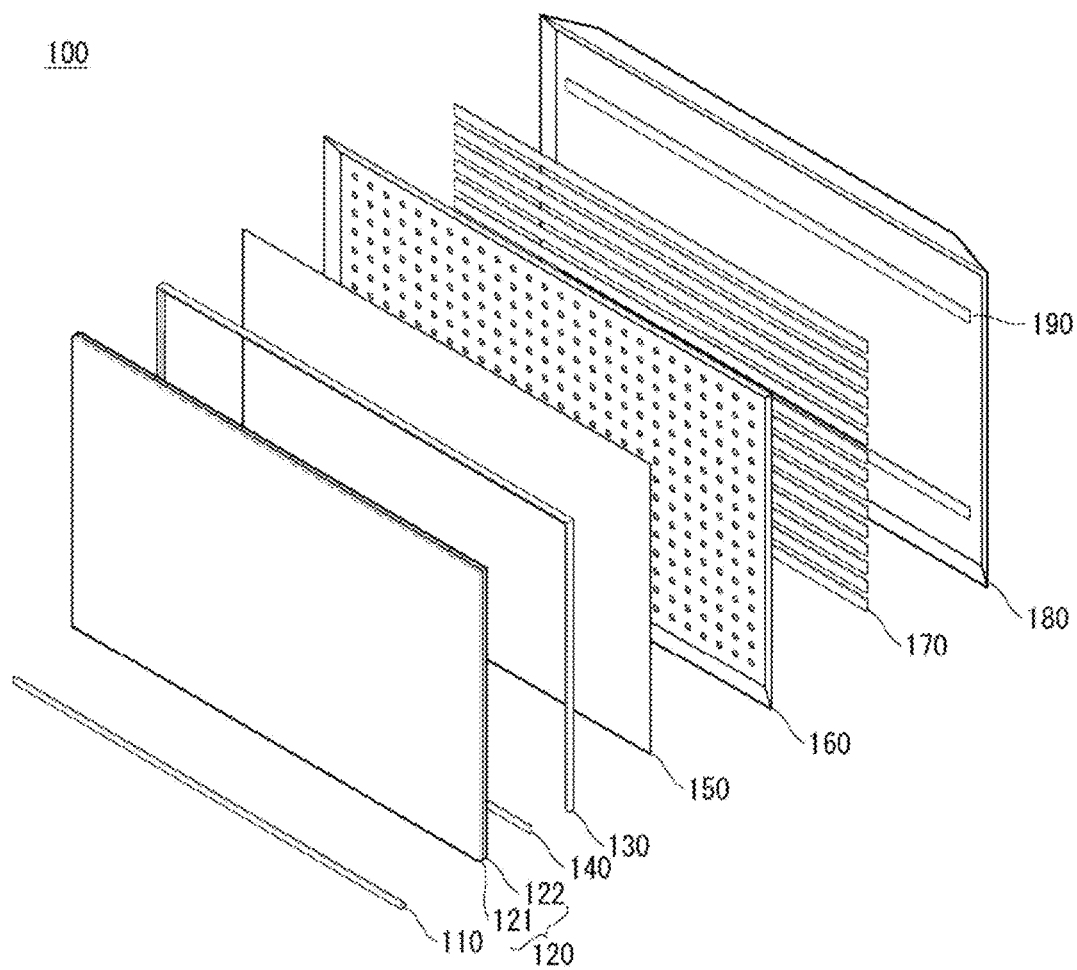

[FIG. 3]
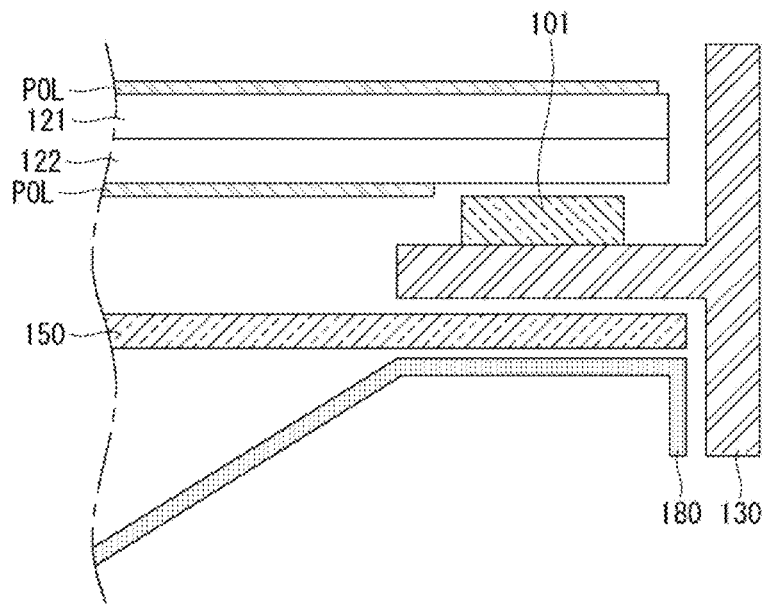
[FIG. 4]
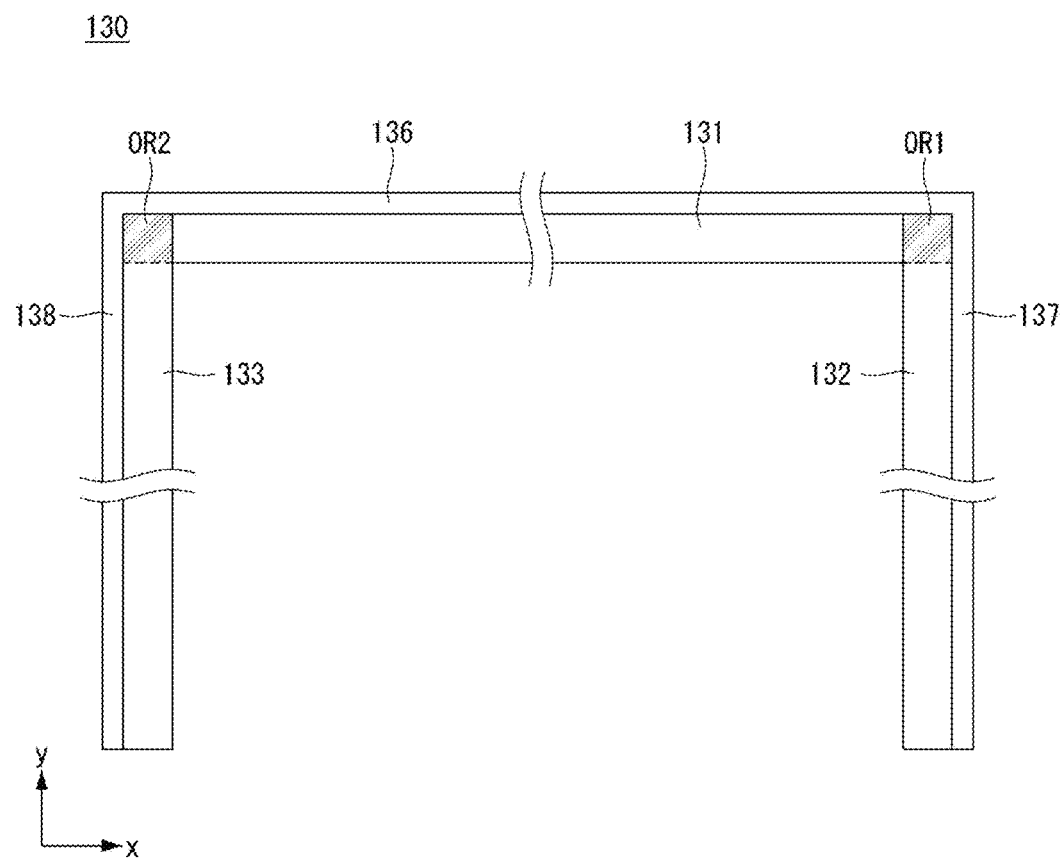

[FIG. 5]
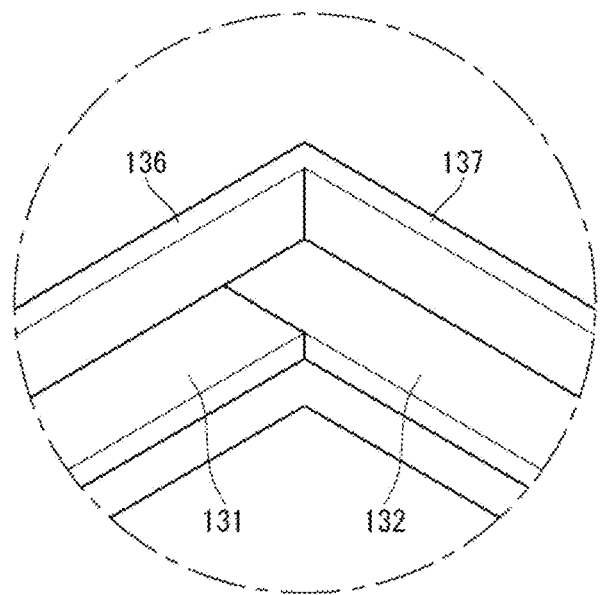
[FIG. 6]
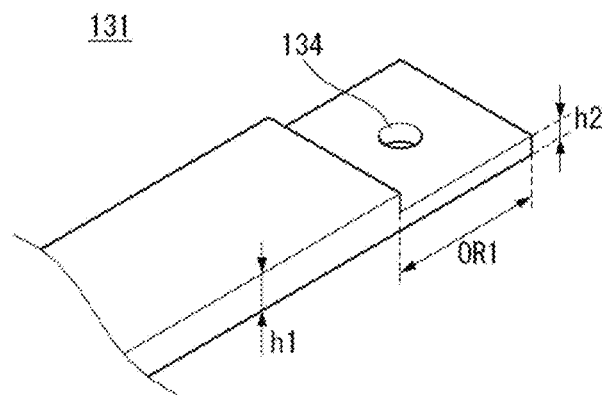
[FIG. 7]
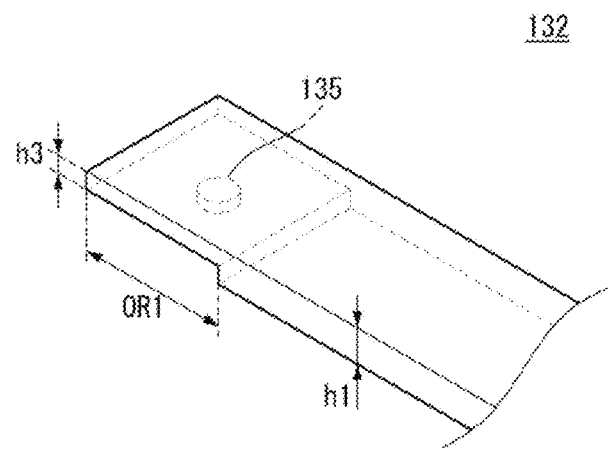

[FIG. 8]
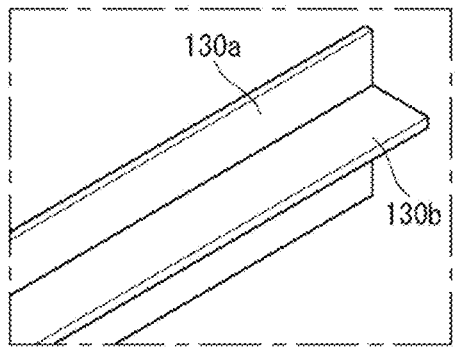
(a)
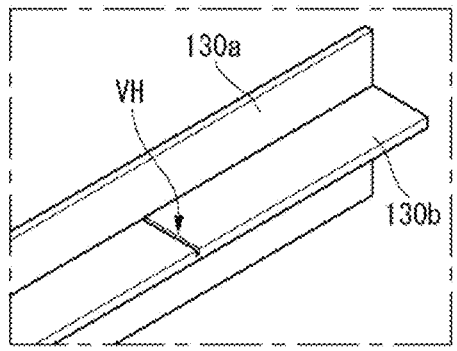
(b)
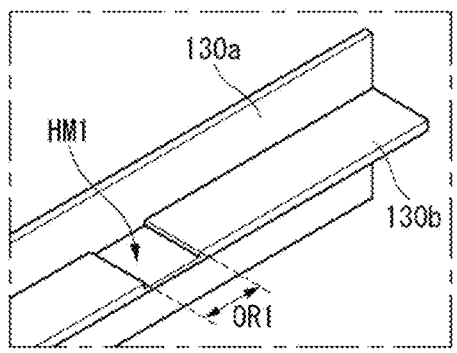
(c)
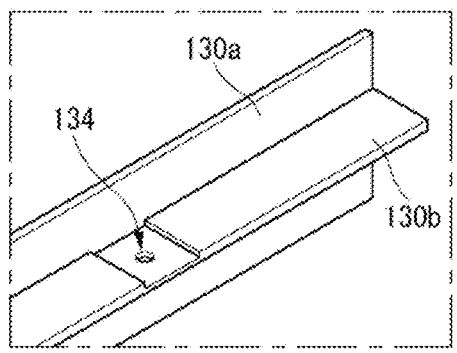
(d)
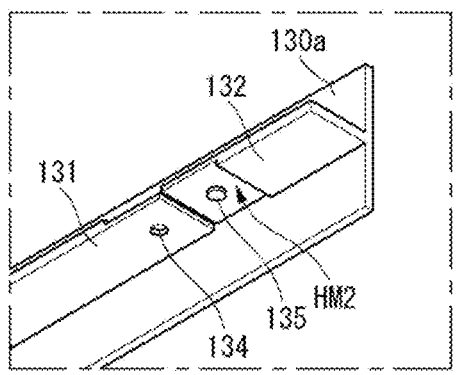
(e)

[FIG. 9]
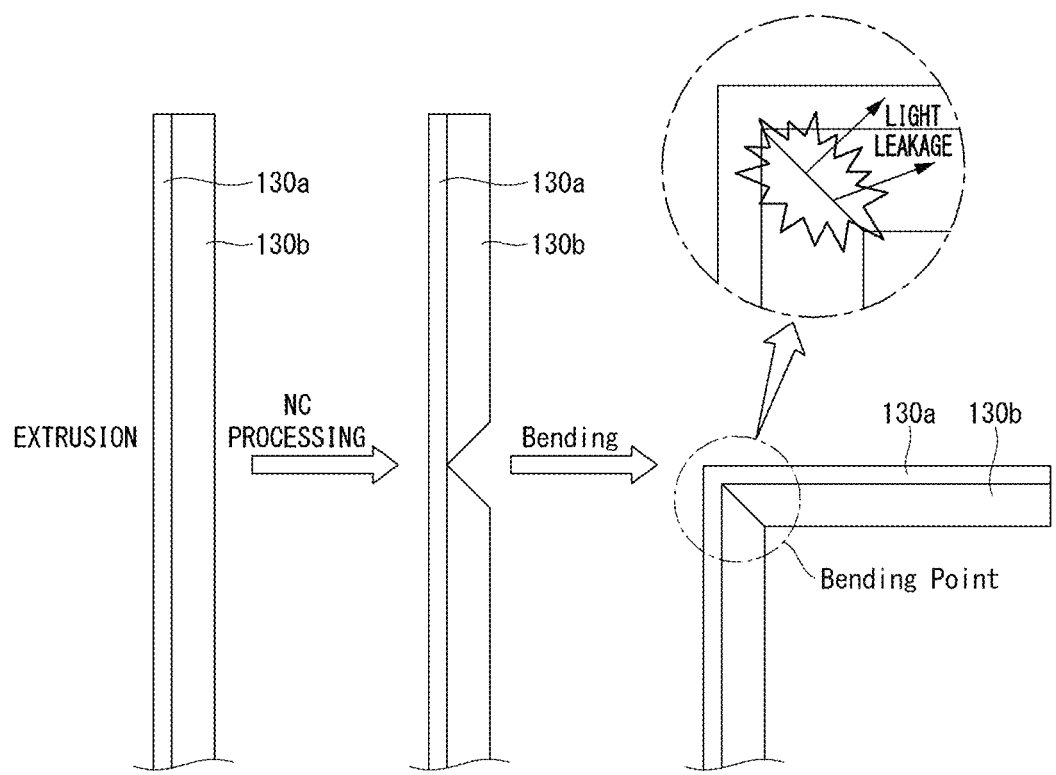

DISPLAY APPARATUS

CROSS-REFERENCE TO RELATED APPLICATIONS

This application is the National Stage filing under 35 U.S.C. 371 of International Application No. PCT/KR2019/014238, filed on Oct. 28, 2019, the contents of which are all incorporated by reference herein in its entirety.

TECHNICAL FIELD

The present disclosure relates to a display apparatus, and particularly, to a display apparatus capable of improving a light leakage phenomenon in a corner area.

BACKGROUND ART

With the development of an information society, a demand for a display device increases in various forms, and according to the demand, in recent years, various flat panel display devices including a liquid crystal display device (LCD), an organic light emitting diode (OLED), etc., have been developed.

Among them the liquid crystal display apparatus (LCD) includes a liquid crystal panel in which a liquid crystal layer is aligned and a backlight unit irradiating light to the liquid crystal panel, and expresses a gray of a pixel by using that a deflection degree of liquid crystals varies depending on an electric field.

In the LCD, a light leakage phenomenon in which the light from the backlight unit is exposed form a gap of another instrument other than the liquid crystal panel occurs, and the light leakage phenomenon gives visual inconvenience to a user.

DISCLOSURE

Technical Problem

In order to satisfy the above-described demand, an object of the present disclosure is to provide a display apparatus capable of improving a light leakage phenomenon in a corner area of the display apparatus.

In particular, an object of the present disclosure is to provide a display apparatus capable of improving occurrence of the light leakage phenomenon in a corner area of a middle cabinet while manufacturing the middle cabinet by a simplified process.

Technical Solution

A display apparatus according to one aspect of the present disclosure includes: a display panel; a case top-down assembly covering a lower area of the display panel; a middle cabinet on which the display panel is mounted; and a cover bottom fastened to the case top-down assembly and the middle cabinet. The middle cabinet includes a first mounting unit which overlaps with a partial area of the display panel at a first long side, and a second mounting unit which overlaps with a partial area of the display panel at a first short side. Ends of the first mounting unit and the second mounting unit overlap with each other in a first overlap region.

The middle cabinet may further include a first support unit which elongates vertically on the end of the first mounting unit, and a second support unit which elongates vertically on the end of the second mounting unit.

The first mounting unit and the first support unit may have a structure to contact each other so as to have a 'T'-shaped cross section, and the second mounting unit and the second support unit, and the second mounting unit and the second support unit may have a structure to contact each other so as to have the 'T'-shaped cross section.

The first support unit and the second support unit may be distinguished as an integrated flat support unit is bent.

The first mounting unit and the second mounting unit may be formed by using an integrated mounting unit which elongates in a vertical direction to the support unit, and the first mounting unit and the second mounting unit may overlap with each other in the overlap region based on the support unit being bent while the integrated mounting unit is cut.

The first mounting unit may have a first height in an area other than the overlap region and a second height in the overlap region, and the second mounting unit may have the first height in the area other than the overlap region and a third height in the overlap region.

A sum of the second height and the third height may be equal to the first height.

The first mounting unit may include a hole formed in the overlap region, and the mounting unit may include a protrusion related to the hole.

The display apparatus may further include a third mounting unit which overlaps with a partial area of the display panel at a second short side and overlaps with the first mounting unit in a second overlap region.

The display apparatus may further include a foam pad interposed between the display panel and the first to third mounting units, and bonding the display panel to the first to third mounting units.

Advantageous Effects

In the display apparatus according to the present disclosure, mounting units overlap with each other in the corner area, and as a result, the middle cabinet can improve occurrence of the light leakage phenomenon between the mounting units.

In particular, the middle cabinet according to the present disclosure can improve the occurrence of the light leakage phenomenon in the corner area without using an additional process or an additional structure.

DESCRIPTION OF DRAWINGS

FIG. 1 is a diagram illustrating a display apparatus according to an embodiment of the present disclosure.

FIG. 2 is an exploded perspective view of the display apparatus according to the embodiment of the present disclosure.

FIG. 3 is a cross-sectional view of the display apparatus according to the embodiment of the present disclosure.

FIG. 4 is a plan view of a middle cabinet according to the embodiment of the present disclosure.

FIG. 5 is a perspective view of the middle cabinet according to the embodiment of the present disclosure.

FIGS. 6 and 7 are perspective views of first and second mounting units of the middle cabinet according to the embodiment of the present disclosure.

FIG. 8 is a diagram for describing a process of forming the middle cabinet according to the embodiment of the present disclosure.

FIG. 9 is a diagram for describing a process of forming the middle cabinet according to a comparative example.

MODE FOR DISCLOSURE

Hereinafter, an embodiment disclosed in the present disclosure will be described in detail with reference to the accompanying drawings and the same or similar components are denoted by the same reference numerals regardless of a sign of the drawing, and duplicated description thereof will be omitted.

In the following description, even though the embodiment are described with reference to a specific drawing, a reference numeral which is not illustrated in the specific drawing can be mentioned if necessary, and the reference numeral not illustrated in the specific drawing is used only when the reference numeral is illustrated in remaining drawings.

Terms such as first, second, A, B, (a), (b), upper, lower, etc., used in the following description may be used. These terms are just intended to distinguish the components from other components, and the terms do not limit the nature, sequence, or order of the components.

Suffixes "module" and "unit" for components used in the following description are given or mixed in consideration of easy preparation of the present disclosure only and do not have their own distinguished meanings or roles.

In the following description, in a case where it is described that a first component is 'connected', 'coupled', 'mounted', 'fastened', 'contacted', or 'accessed' to a second component, the case may include a case where a third component is 'connected', 'coupled', 'mounted', 'fastened', 'contacted', or 'accessed' between the first component and the second component in addition to a case where the first component is directly 'connected', 'coupled', 'mounted', 'fastened', 'contacted', or 'accessed' to the second component.

In the following description, when it is judged that a detailed description of known technology may make the gist of the present disclosure obscure, the detailed description of the known technology may be omitted.

In the following description, it is to be understood that the accompanying drawings are just used for easily understanding the embodiments disclosed in the present disclosure and a technical spirit disclosed in the present disclosure is not limited by the accompanying drawings and all changes, equivalents, or substitutes included in the spirit and the technical scope of the present disclosure are included.

Terms such as a height, a length, a width, etc., used in the following description may be mixedly used for convenience of description, and do not meanings or roles distinguished from each other in themselves.

Hereinafter, a display panel will be described by taking a liquid crystal display device (LCD)) as an example, but the display panel which may be applied to the present disclosure is not limited to the LCD.

FIG. 1 is a perspective view illustrating a display apparatus according to an embodiment of the present disclosure.

Referring to FIG. 1, hereinafter, the display apparatus 100 according to the present disclosure may include a first long side LS1, a second long side LS2 facing the first long side LS1, a first short side SS1 contiguous to the first long side LS1 and the second long side LS2, and a second short side SS2 facing the first short side SS1.

Here, an area of the first short side SS1 may be referred to as a first side area, an area of the second short side SS2 may be referred to as a second side area facing the first side area, an area of the first long side LS1 may be referred to as a third side area contiguous to the first side area and the second side area, and positioned between the first side area and the second side area, and an area of the second long side LS2 may be referred to as a fourth side area contiguous to the first side area and the second side area, and positioned between the first side area and the second side area, and facing the third side area.

Moreover, for convenience of description, it is illustrated and described that lengths of the first and second long sides LS1 and LS2 are larger than lengths of the first and second short sides SS1 and SS2, respectively, but the lengths of the first and second long sides LS1 and LS2 may also be equal to the lengths of first and second short sides SS1 and SS2, respectively.

Moreover, hereinafter, a first direction DR1 may be a direction parallel to the long sides LS1 and LS2 of the display panel 110, and a second direction DR2 may be a direction parallel to the short sides SS1 and SS2 of the display panel 110. A third direction DR3 may be a direction vertical to the first and second directions DR1 and DR2.

By assuming that the display surface of the display apparatus 100 as a horizontal surface, the first direction DR1 and the second DR2 may be collectively referred to as a horizontal direction. As a result, the third direction DR3 may be referred to as a vertical direction.

A side to which the display apparatus 100 displays an image may be referred to as a forward direction or a front side or front surface. When the display apparatus 100 displays the image, a side where the image may not be observed may be referred to as a rearward direction or a rear side or rear surface. When the display apparatus 100 is viewed at the front direction or front side or front surface, a side surface at the first long side LS1 may be referred to as an upper side or upper surface. Similarly, a side surface at the second long side LS2 may be referred to as a lower side or lower surface. Similarly, a side surface at the first short side SS1 may be referred to as a right side or right surface, and a side surface at the second short side SS2 may be referred to as a left side or left surface.

Moreover, the first long side LS1, the second long side LS2, the first short side SS1, and the second short side SS2 may be referred to as edges of the display apparatus 100. Further, a point where the first long side LS1, the second long side LS2, the first short side SS1, and the second short side SS2 meet each other may be referred to as a corner. For example, a point where the first long side LS1 and the first short side SS1 meet may become a first corner C1, a point where the first long side LS1 and the second short side SS2 meet may become a second corner C2, a point where the second short side SS2 and the second long side LS2 meet may become a third corner C3, and a point where the second long side LS2 and the first short side SS1 meet may become a fourth corner C4.

Here, a direction toward the second short side SS1 from the first short side SS1 or a direction toward the first short side SS1 from the second short side SS2 may be referred to as a left-right direction LR. A direction toward the second long side LS2 from the first long side LS1 or a direction toward the first long side LS1 from the second long side LS2 may be referred to as an up-down direction UD.

FIG. 2 is an exploded perspective view of the display apparatus and FIG. 3 is a cross-sectional view of the display apparatus. In particular, FIGS. 2 and 3 illustrate components of a display panel including a display panel. Further, FIG. 3 illustrates an end of a display apparatus in which a middle cabinet is formed.

Referring to FIGS. 2 and 3, the display apparatus according to the embodiment of the present disclosure includes a case top-down assembly 110, a display panel 120, a middle cabinet 130, a guide panel down assembly 140, an optical sheet 150, a reflection plate 160, a backlight unit 170, a cover bottom 180, and a reinforcement bar 190.

The case top-down assembly 110 is fastened at a lower portion of the display panel 120 to cover a partial area at the second long side LS2 on the lower surface and the upper surface of the display panel 120. The case top-down assembly 110 may also be fastened to the cover bottom 180.

The display panel 120 may be provided to the front surface of the display apparatus 100 and may display the image. The display panel 120 includes pixels constituted by red (R), green (G), and blue (B), or red (R), green (G), blue (B), and white (W) subpixels, and displays a color image by adjusting a gray of the subpixels. The display panel 110 may be divided into an active area in which the image is displayed and a de-active area in which the image is not displayed. The display panel 120 may include a front-surface substrate 121 and a rear-surface substrate 122 facing each other, which are interposed with the liquid crystals.

The front-surface substrate 121 may have a color filter, and include the pixels constituted by the R, G, and B or R, G, B, and W subpixels.

The rear-surface substrate 12 may include switching elements. The rear-surface substrate may switch a pixel electrode. For example, the pixel electrode may change a molecular array of the liquid crystal layer according to a control signal applied from the outside.

The liquid crystal layer may include liquid crystal molecules. The liquid crystal molecules may change the array in response to a voltage difference generated between the pixel electrode and a common electrode. The liquid crystal layer may transfer the light provided from the backlight unit 170 to the front-surface substrate or block the light.

The middle cabinet 130 supports a side surface area of the display panel 120. On a cross section, the middle cabinet 130 has a structure of seating the end of the display panel 120. The middle cabinet 130 may be configured in a form to surround two or more side surfaces among the side surfaces of the display panel 120. In the present disclosure, the middle cabinet 130 has a form to surround three side surfaces of the display panel, e.g., an upper side surface, a left side surface, and a right side surface. The middle cabinet 130 may be bonded to the rear surface substrate 122 of the display panel 120 through a foam pad 101.

The guide panel down assembly 140 surrounds an area not covered by the middle cabinet 130. For example, when the middle cabinet 130 covers the first long side LS1, and the first and second short sides SS1 and SS2 of the display panel 120, the guide panel down assembly 140 may cover the second long side LS2 area of the display panel 120.

The optical sheet 150 may evenly transfer light of a light source to the display panel 120. The optical sheet 150 may be configured by a layer constituted by multiple sheets. For example, the optical sheet 150 may include a prism sheet, a diffusion sheet, etc. The optical sheet 150 may be disposed between the cover bottom 180 and the middle cabinet.

The reflection plate 160 used for increasing efficiency of the light irradiated from the backlight unit 170 may be made of a material having a high reflectivity. The reflection plate 160 may have a hole for transmitting the light from the backlight unit 170.

The backlight unit 170 is positioned at a rear side of the display panel 120, and irradiates the light toward the display panel 120. The backlight unit 170 may include light sources for emitting the light, and the light source may include multiple LEDs. The backlight unit 120 may be driven in a total driving scheme or a partial driving scheme such as local dimming impulsive.

The cover bottom 180 supports the components of the display apparatus 100, and provides a space for mounting the backlight unit 170. The cover bottom 180 may be coupled to the optical sheet 150 and/or the middle cabinet 130. The reinforcement bar 190 for reinforcing a rigidity may be coupled to the cover bottom 180.

Further, a heat dissipation plate (not illustrated) for emitting heat to the outside may be formed between the cover bottom 180 and the backlight unit 170.

FIG. 4 is a plan view of a middle cabinet assembly and FIG. 5 is a diagram illustrating a corner portion of the middle cabinet assembly. FIG. 6 is a diagram illustrating a first mounting unit of the middle cabinet and FIG. 7 is a diagram illustrating a second mounting unit of the middle cabinet.

Referring to FIGS. 4 to 7, the middle cabinet 130 includes first to third support units 136, 137, and 138 and first to third mounting units 131, 132, and 133.

The first to third support units 136, 137, and 138 may be perpendicularly in contact with each other and may have a '⌐' shape.

The first support unit 136 may correspond to the first long side LS1 of the display apparatus 100, the second support unit 137 may correspond to the first short side SS1, and the third support unit 138 may correspond to the second short side SS2. The first to third support units 136, 137, and 138 may be names distinguished with a curved area as a boundary, and may not be separated physically.

The first to third mounting units 131, 132, and 133 provide a space on which some areas of edge areas of the display panel 120 are mounted.

The first mounting unit 131 elongates from the first support unit 136 in a vertical direction, the second mounting unit 132 is extended from the second support unit 137 in the vertical direction, and the third mounting unit 133 is extended from the third support unit 138 in the vertical direction. Cross sections of the first mounting unit 131 and the first support unit 136 may have a 'T' shape and similarly, the cross sections of the second mounting unit 132 and the second support unit 137 and the cross sections of the third mounting unit 133 and the third support unit 138 may also have the 'T' shape.

The first mounting unit 131 includes a non-overlap region having a first height h1 and an overlap region OR1 having a second height h2. A hole 134 is formed in the overlap region OR1 of the first mounting unit 131.

The second mounting unit 132 includes a non-overlap region having a first height h1 and a first overlap region OR1 having a third height h2. A protrusion 135 inserted into the hole 134 is formed in the first overlap region OR1 of the second mounting unit 132. The first mounting unit 131 and the second mounting unit 132 overlap with each other so that the protrusion 135 is inserted into the hole 134.

A sum of the second height h2 of the first mounting unit 131 and the third height h3 of the second mounting unit 132 may be equal to the first height h1. As a result, when viewed in a horizontal direction parallel to the display panel 120, there is no step between an upper surface of the first mounting unit 131 and the upper surface of the second mounting unit 132, and further, there may be no step between a lower surface of the first mounting unit 131 and the lower surface of the second mounting unit 132.

Likewise, the first mounting unit 131 and the third mounting unit 133 may overlap with each other in the second overlap region OR2.

FIG. 8 is a diagram for describing a process of forming the middle cabinet according to the embodiment of the present disclosure. In particular, FIG. 8 primarily illustrates a corner portion where the first overlap region is formed.

Referring to FIG. 8(a), a cross section forms a 'T'-shaped frame through extrusion molding. That is, the middle cabinet may include a support unit 130a, and a mounting unit 130b vertically extended on one surface of the support unit 130a. The mounting unit 130b may be divided into first to third mounting units 131, 132, and 133 through a follow-up process.

Referring to FIG. 8(b), a cutting process is performed so that a groove (VH) having a cross section with a 'V' shape is formed on one surface of the mounting unit 130a. Hereinafter, one surface where the groove (VH) is formed will be referred to as the upper surface.

Referring to FIG. 8(c), numerical control processing is performed so as to expand a cutting area. A first concave portion HM1 expanded through the NC processing corresponds to the first overlap region.

Referring to FIG. 8(d), the hole 134 is formed on the first concave portion HM1.

Referring to FIG. 8(e), a boundary of the mounting unit 130B is physically separated by cutting an end of the first concave portion HM1. The first concave portion HM1 including the hole 134 corresponds to the first mounting unit 131, and an area contacting the first concave portion HM1 corresponds to the second mounting unit 132.

Subsequently, a second concave portion HM2 is formed on the lower surface of the second mounting unit 132 through the NC processing. A process of forming the second concave portion HM2 includes the protrusion 135 in the second concave portion HM2. The second concave portion MH2 may become the first overlap region OR1.

Subsequently, a bending process of bending the support unit 130a with an area contacting the first and second mounting units 131 and 132 as the boundary is performed. In the bending process, the second concave portion HM2 with the protrusion 135 is bent up while the first concave portion HM1 with the hole 134 is bent down to avoid the protrusion 135 from being suspended on the end of the first mounting unit 131. In addition, the bending process is performed so that the protrusion 135 is inserted into the hole 134 to make the first concave portion HM1 and the second concave portion HM2 from overlapping with each other in the first overlap region OR1.

Further, by using a method illustrated in FIG. 8, a structure in which the first mounting unit 131 and the third mounting unit 133 overlap with each other in the second overlap region OR2 may be implemented.

Through the process described in FIG. 8, since the middle cabinet 130 is formed by bending one frame, the middle cabinet 130 may be manufactured by comparatively simple NC processing. In particular, since the first and second mounting units 131 and 132 overlap with each other in the first overlap region OR1, the middle cabinet 130 according to the present disclosure may prevent a light leakage phenomenon in which the light from the backlight unit 170 leaks.

This is described as follows in addition to a comparative example illustrated in FIG. 9.

FIG. 9 is a diagram for describing a process of forming the middle cabinet according to a comparative example.

Referring to FIG. 9, in order to form the middle cabinet 130 according to the comparative example, a single frame including the support unit 130a and the mounting unit 130b may be manufactured by an extrusion process. In addition, in the bending area of the middle cabinet 130, a plane of the mounting unit 130b may be cut by 'V' cutting. Subsequently, the corner of the cabinet 130 may be formed by performing the bending process so that 'V' cut areas are in contact with each other. In the comparative example illustrated in FIG. 8, since ends of the mounting unit 130b are in contact with each other in the bending area, a gap may be physically generated, and the light leakage phenomenon may occur through the gap. In order to improve the light leakage phenomenon in the middle cabinet 130 according to the comparative example, an additional welding process or a process of bonding an additional structure for covering the gap is required.

Contrary to this, according to the embodiment illustrated in FIG. 8, the gap of the bending area may be prevented from being generated through a simple NC process performed during the bending process without the additional welding process or bonding the additional structure.

Certain embodiments or other embodiments of the present disclosure described above are not mutually exclusive or distinct from each other. Components or functions each of certain embodiments or other embodiments of the present disclosure described above may be jointly used or combined with each other.

For example, the case means that a configuration A described in a specific embodiment and/or drawing and a configuration B described in another embodiment and/or drawing are may be combined with each other. Namely, although the combination between the components is not directly described, the combination is possible except in the case where it is described that the combination is impossible.

It should be considered that the detailed description should not be construed as restrictive in all terms and is exemplary. The scope of the present disclosure should be determined by rational construing of the appended claims and all modifications within an equivalent scope of the present disclosure are included in the scope of the present disclosure.

The invention claimed is:

1. A display apparatus comprising:
 a display panel;
 a case top-down assembly covering a lower side of the display panel, wherein an upper and lateral sides of the display panel are not covered by the case top-down assembly cover;
 a middle cabinet on which the upper and lateral sides of the display panel are mounted, wherein the lower side of the display panel is not mounted on the case top-down assembly; and
 a cover bottom coupled to the case top-down assembly and the middle cabinet,
 wherein the middle cabinet comprises:
  a first mounting unit which overlaps with a partial area of the display panel along the entire lower side of the display panel and extending inward from a first support unit; and
  a second mounting unit which overlaps with a partial area of the display panel along an entire first lateral side of the display panel and extending inward from a second support unit, and
 wherein an end of the first mounting unit and an end of the second mounting unit overlap each other in a first overlap region located at a corner of the middle cabinet corresponding to a corner of the display panel, and wherein the first support unit and the second support unit are integrally formed from a bent integrated support unit bent at a location corresponding to the first overlap region.

2. The display apparatus of claim 1, wherein:

the first support unit extends perpendicular to the first mounting unit, and the second support unit extends perpendicular to the second mounting unit.

3. The display apparatus of claim 2, wherein the first mounting unit and the first support unit form a 'T'-shaped cross section, and the second mounting unit and the second support unit form a 'T'-shaped cross section.

4. The display apparatus of claim 3, wherein the first mounting unit is integrally formed with the first support unit and the second mounting unit is integrally formed with the second support unit.

5. The display apparatus of claim 4, wherein a sum of the second height and the third height is equal to the first height.

6. The display apparatus of claim 1, wherein a thickness of the first mounting unit is a first height in an area other than the overlap region and a second height in the overlap region, and a thickness of the second mounting unit is the first height in the area other than the overlap region and a third height in the overlap region.

7. The display apparatus of claim 1, wherein the first mounting unit includes a hole formed in the overlap region, and the second mounting unit includes a protrusion related to the hole.

8. The display apparatus of claim 1, further comprising:

a third mounting unit which overlaps with a partial area of the display panel along a second lateral side and having an end which overlaps with another end of the first mounting unit in a second overlap region.

9. The display apparatus of claim 8, further comprising:

a foam pad bonding the display panel to the first to third mounting units.

* * * * *